March 29, 1932. C. DOMAN 1,851,571
MEANS FOR RETARDING SPINNING OF AUTOMOBILE TRANSMISSION
GEARS DURING GEAR SHIFTING OPERATION
Filed Jan. 31, 1930 3 Sheets-Sheet 1

March 29, 1932.   C. DOMAN   1,851,571
MEANS FOR RETARDING SPINNING OF AUTOMOBILE TRANSMISSION
GEARS DURING GEAR SHIFTING OPERATION
Filed Jan. 31, 1930   3 Sheets-Sheet 3

Carl Doman
INVENTOR

By Bodell & Thompson
ATTORNEYS.

Patented Mar. 29, 1932

1,851,571

UNITED STATES PATENT OFFICE

CARL DOMAN, OF SYRACUSE, NEW YORK, ASSIGNOR TO FRANKLIN DEVELOPMENT CORPORATION, OF SYRACUSE, NEW YORK, A CORPORATION OF NEW YORK

MEANS FOR RETARDING SPINNING OF AUTOMOBILE TRANSMISSION GEARS DURING GEAR SHIFTING OPERATION

Application filed January 31, 1930. Serial No. 425,015.

This invention has for its object, means for braking or retarding the rotation or spinning of the rotatable parts of an automobile change speed gearing during gear shifting operations in order to facilitate the meshing of the shiftable gears with stationary gears, which means is particularly simple and economical in construction, readily embodied in standard forms of transmission gearings, and highly efficient and durable in use.

The invention consists in the novel features and in the combinations and constructions hereinafter set forth and claimed.

In describing this invention, reference is had to the accompanying drawings in which like characters designate corresponding parts in all the views.

Figure 3 is a fragmentary, sectional view of the gear housing illustrating another form of the invention.

Figure 4 is an enlarged sectional view on line 4—4, Figure 3.

Figure 5 is an enlarged longitudinal sectional view illustrating another embodiment of the invention.

This invention comprises generally, a brake acting on a rotatable part of the automobile transmission gearing, the application of the brake being preferably controlled by the throwing out of the clutch pedal preliminary to gear shifting operations, and also by the temperature or the consistency or thickness of the oil in the gear housing due to its temperature. In cold weather, when the oil is thick, gear shifting without clashing of the gears, is particularly easy, as the thick cold oil retards spinning of the gears when the main clutch is thrown out. When the oil becomes heated, as it does after the automobile has been run, the oil becomes thinner.

This invention acts on the rotatable parts of the gearing, or those rotatable with the drive shaft of the gearing to retard the rotation thereof in a manner similar to the action of the oil in cold weather.

The transmission gearing may be of any suitable and well known form, size and construction including the usual housing and rotatable parts as driving, driven and counter shafts with gears thereon, the gears on one of said shafts, usually the driven shaft, being shiftable to produce low, second and direct drive, or third speed, and also to produce reverse speed.

1 designates the gear housing. 2 the drive shaft. 3 the transmission or driven shaft, and 4 the counter shaft. The drive shaft 2 is connected in the usual manner to the engine by a normally engaged clutch C, the driven member 5 of which is mounted on the shaft 2 to rotate therewith. The clutch is normally held engaged by the usual spring 6 and is thrown out against the action of the spring by the clutch pedal 7.

Figure 1:
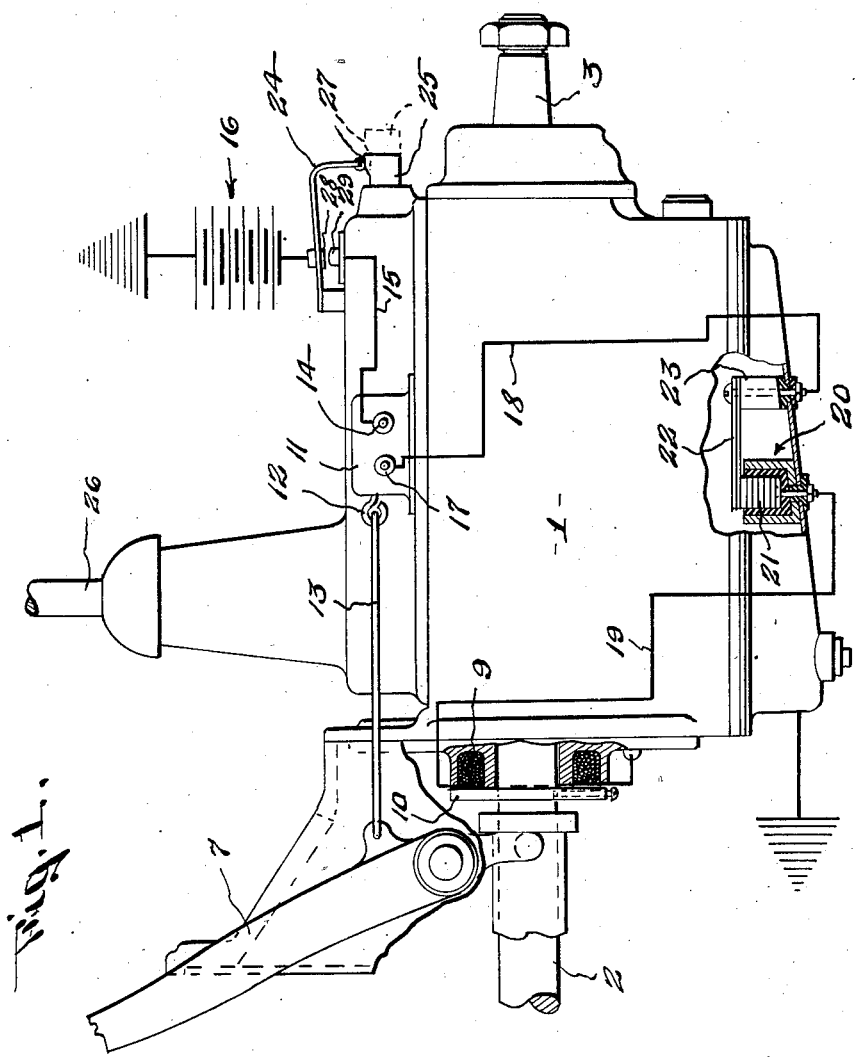
Figure 1 is a side elevation, partly diagrammatic, and partly in section, of a transmission gearing and contiguous parts embodying this invention.
Figure 2:
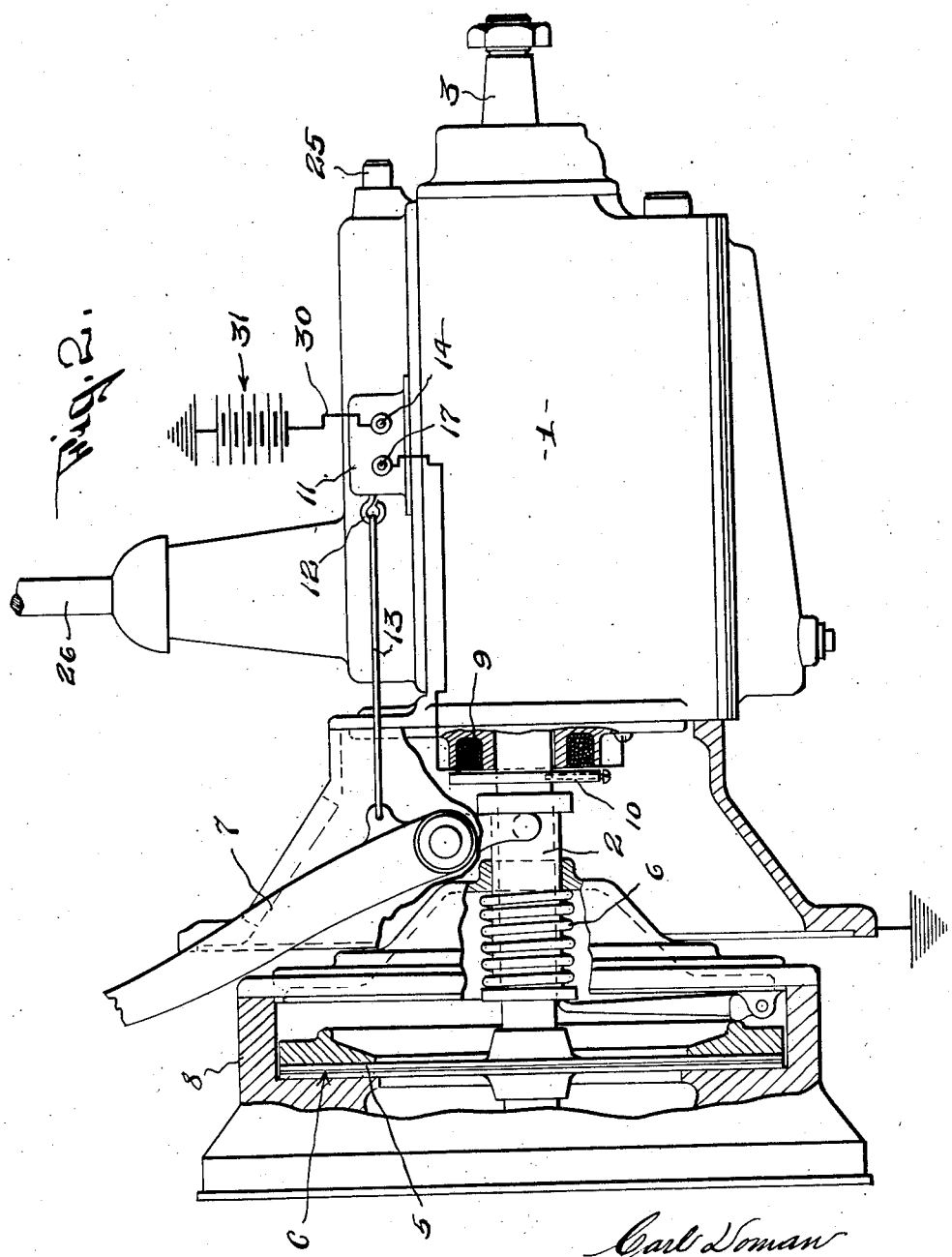
Figure 2 is a view similar to Figure 1 showing a modified form of the invention.

8 designates the fly wheel of the engine. In Figures 1 and 2, the brake for retarding the rotation of the transmission gears is shown as an electro-magnetic brake.

9 designates the coils of an electro-magnet supported by the gear housing concentric with the drive shaft 2, and 10 is an annular armature mounted in juxtaposition to the electro-magnet 9, this armature being mounted on and rotatable with the shaft 2, but having a slight movement axially of the shaft. The circuit through the coils of the electro-magnet is normally open and is closed by a switch preferably operable by the throwing out of the clutch pedal 7 and also by a thermostatically operated switch or circuit closure controlled by the temperature of the oil in the gear housing 1.

11 designates the casing of a normally open switch mounted on the gear housing and including a movable member 12 which is connected by a link 13 to the clutch pedal 7. One terminal 14 of the switch is connected by a wire 15 to one side of the battery 16, and the other terminal 17 is connected to the coils of the electro-magnet 9 through wires 18 and 19 connected together through a thermostatically operated circuit closer subject to the temperature of the oil in the gear housing 1.

The thermostatically operated device 20 as here shown comprises a carbon pile 21 and a thermostat 22 arranged to normally permit the carbon disks of the pile to separate so that they offer a maximum resistance to the current and to press them together so that less resistance is offered to the current when the thermostat is operated by a rise in temperature of the oil in the gear housing.

The carbon pile may be of any suitable form, size and construction and is mounted on the bottom of the gear housing within the housing. The wire 19 is connected to the lowermost disk of the pile. The wire 18 is connected to the thermostat 22. The thermostat is in the form of a leaf secured at one end to a support or post 23 on the bottom of the gear housing, and the free end of the thermostat presses against the uppermost disk of the pile.

In operation, eliminating for the moment the switch designated generally 24, when the clutch pedal 7 is operated to throw out the engine clutch, the switch 11 will be closed and the current will pass from the battery to the coils of the electro-magnet 9 if sufficient resistance is not offered by the carbon pile and when the magnet is energized, it will attract its armature 10 and thus brake or retard the rotation of the gearing. If the oil is cold, little or no current will pass through the carbon pile 20. When however, the engine heats up and the oil becomes heated, the temperature of the oil will cause the thermostat 22 to press the disks of the carbon pile 21 together so that there is little resistance offered to the current and hence, each time the main clutch is thrown out by depressing the pedal 7, the electro-magnet 9 will be energized and retard the rotation of the gears.

As the clutch is thrown out preliminary to gear shifting operations, the speed of the gears will be retarded during gear shifting operation. As the retarding effect is desirable only when shifting up, that is, from low gear to second, and from second to high, and it is not desirable when shifting down from high to second, as is oftentimes desirable when driving down steep hills, means may be provided for cutting out the braking effect when shifting down from high to second. This means is here shown as a normally closed switch 24 in the circuit between the battery 16 and the switch 11 and operable to open position when the gear is shifted into third or high speed gear so that when it is desired to shift from high to second, the closing of the switch 11 will not close the circuit through the magnetic brake as the circuit is held open by the switch 24 and therefore, as the shift is made very quickly, little or no retarding effect will take place while the shift is being made from high to second for the reason that the circuit from the electro-magnet is not energized while the shift is being made, and not preliminary to shifting.

Change speed gears as is well known, usually have two slidable shift rods as 25, one of which is selected and used when shifting into reverse gear and low gear, and the other of which is selected and used when shifting into second, or into high. These rods are operated by the usual selecting and shifting lever 26, all as will be understood by those skilled in the art. The high speed shift rod 25 is provided with a cam surface 27 arranged to operate the switch 24 and separate the contacts 28, 29 when the shift rod 25 is in its position assumed when the transmission gearing is in high or direct drive position. When in this position, if it is desired to shift into second, depression of the foot pedal 7 will close the switch 11, but the electric circuit to the electro-magnetic brake 9 will be open owing to the separation of the contacts 28, 29 of the switch 24.

Therefore, no retarding effect takes place when the clutch pedal 7 is thrown out. The shifting of the gears is effected almost instantly and is completed before any retarding effect will be effective due to the closing of the contacts 28 and 29 when the high speed shift rod 25 reaches neutral position and the cam 27 moves out of engagement with the switch 24.

In Figure 2, a construction is shown in which the switch 24 and its function is omitted, and also in which the thermostatically operated switch is omitted, the terminals of the switch 11 being connected by a wire 30 directly to the coils 9 of the electro-magnet and by a wire 31 to the battery. In Figure 2, upon each depression of the pedal 7, the electro-magnet 9 will be energized and a retarding effect takes place whether shifting up or down through the speed changes.

In Figures 3 and 4, a brake is shown applied directly to the countershaft 4, this being constantly applied.

32 designates a brake shoe having a lining or facing 33 of braking material, this shoe being carried by a bracket 34 embodying a resilient strip 35 tending to press the shoe toward the shaft 4. The bracket 34 is mounted in a suitable guide block 36 mounted upon the bottom of the gear housing and secured thereto as by screws 37 extending through a plate 38 on the outside of the bottom of the housing and extending through said bottom and threading into the block 36. A set screw 39 also extends through the plate 38, bottom of the housing and threads into the block 36 against the resilient strip 35 to adjust the initial tension thereof, the screw being held in its adjusted position by a nut 40.

In Figure 5, the strip 35 is shown as used in conjunction with the strip 41 of another metal having a different coefficient of expansion so that the two act as a thermostat to automatically adjust the pressure of the brake shoe 32. In either case, the set screw is adjusted initially, and in the latter case in which a thermostat is used, the pressure is further controlled by the thermostat. The brake shoe presses directly against the periphery of the shaft 4 and although a lining or facing 33 is used, a metal to metal contact may be used. The pressure applied is very little but sufficient to restrain spinning of the gears.

In any embodiment of my invention, spinning of the gears is automatically restrained when the force tending to turn them is released as when the clutch pedal is thrown out so that gear shifting operations are performed without clashing of the gears.

In the form shown in Figures 1 and 5, the braking effect is controlled by thermostatic means, and in Figure 1, the thermostatic means is used in conjunction with the clutch pedal.

What I claim is:

1. The combination with an automobile change speed transmission gearing comprising a housing and the usual complement of shafts and shiftable gears in the housing, and the engine clutch including a shiftable clutch section connected to the drive shaft of the gearing and shiftable to disconnect the gearing from the engine and operable to disconnect the gearing from the engine preliminary to gear shifting operations, of a magnetic brake acting on a rotatable part of the gearing to restrain spinning of the rotatable parts of the gearing during gear shifting operations when the engine clutch is thrown out.

2. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on a rotatable part of the gearing to restrain spinning of the rotatable parts of the gearing during gear shifting operations when the engine clutch is thrown out, and means controlled by the temperature of the oil in the gear housing for controlling the application of the brake.

3. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on a rotatable part of the gearing to restrain the spinning of the rotatable parts of the gearing during gear shifting operations when the engine clutch is thrown out, and means including a thermostat subject to the temperature of the oil in the gear housing for controlling the application of the brake.

4. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on the rotatable part of the gearing to restrain spinning of the rotatable parts of the gearing during gear shifting operations when the engine clutch is thrown out, an electro magnetic brake acting on a rotatable part of the gearing, an electric circuit having a normally open switch therein operable into closed position by the throwing out of the clutch.

5. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on a rotatable part of the gearing to restrain spinning of the rotatable parts of the gearing during gear shifting operations when the engine clutch is thrown out, an electro-magnetic brake acting on the rotatable part of the gearing, an electric circuit having a normally open switch therein operable into closed position by the throwing out of the clutch, and a thermostatically operated circuit closer subject to the temperature of the oil in the gear housing for controlling the flow of current through said circuit when the first mentioned switch is closed.

6. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on a rotatable part of the gearing to restrain the spinning of the rotatable parts of the gearing during gear shifting operations when the engine clutch is thrown out, an electromagnetic brake acting on a rotatable part of the gearing, an electric circuit having a normally open switch therein operable into closed position by the throwing out of the clutch, and a second normally closed switch in said circuit and operable to open position by the shifting of the gearing into high speed position.

In testimony whereof, I have hereunto signed my name, at Syracuse, in the county of Onondaga, and State of New York, this 28th day of January, 1930.

CARL DOMAN.